United States Patent [19]

Schlaechter

[11] Patent Number: 4,534,346
[45] Date of Patent: Aug. 13, 1985

[54] PRESSURE SWING CYCLE FOR THE SEPARATION OF OXYGEN FROM AIR

[75] Inventor: John Schlaechter, Grandview, Ohio

[73] Assignee: Guild Associates, Inc., Worthington, Ohio

[21] Appl. No.: 475,543

[22] Filed: Mar. 15, 1983

[51] Int. Cl.³ .............................................. A61M 16/00
[52] U.S. Cl. .................................. 128/205.12; 55/25; 55/58; 55/68
[58] Field of Search ...................... 128/202.26, 205.12; 55/58, 68, 25

[56] References Cited

U.S. PATENT DOCUMENTS

| | | | |
|---|---|---|---|
| 3,280,536 | 10/1966 | Berlin | 55/58 |
| 4,065,272 | 12/1977 | Armond | 55/58 |
| 4,194,891 | 3/1980 | Earls et al. | 55/58 |
| 4,194,892 | 3/1980 | Jones et al. | 55/58 |
| 4,428,372 | 1/1984 | Beysel et al. | 128/205.12 |
| 4,449,990 | 5/1984 | Tedford, Jr. | 55/58 |
| 4,477,264 | 10/1984 | Kratz et al. | 55/58 |

Primary Examiner—Henry J. Recla
Attorney, Agent, or Firm—Porter, Wright, Morris & Arthur

[57] ABSTRACT

An improved pressure swing adsorption cycle which is preferably useful for the continuous production of a relatively minor amount of a purified gas, and a method which is useful to provide a continuous therapeutic supply of oxygen at a level required by an individual patient for the treatment of chronic obstructive pulmonary diseases and other health conditions.

5 Claims, 3 Drawing Figures

PRESSURE SWING CYCLE FOR THE SEPARATION OF OXYGEN FROM AIR

FIELD OF THE INVENTION

This invention relates to an improved pressure swing adsorption cycle which is preferably useful for the continuous production of a relatively minor amount of a purified gas, and to a method which is useful to provide a continuous therapeutic supply of oxygen at a level required by an individual patient for the treatment of chronic obstructive pulmonary diseases and other health conditions.

BACKGROUND OF THE PRIOR ART

Sorption cycles involve the process of physical adsorption and the manipulation of a fluid through a medium which has a selective affinity for a component species or specie of the fluid. As a multi-component fluid passes through the medium, the species or specie is "adsorbed", and the fluid exiting the medium contains a predetermined species in a quantity less than that in the fluid originally entering, or conversely, the fluid exiting is relatively enriched in proportion to the components of the fluids which are not absorbed. Certain media are capable of "desorbing" the specie after adsorption (such as when they are heated or subjected to a "purge"); and an adsorption/desorption "cycle" is well known.

Sorption technology is of practical use in many applications of gas separation or purification. In these instances, given a particular commercial application, a cycle and corresponding apparatus is devised to accomplish a given task. The apparatus generally consists of one or more "beds" containing the sorbent medium, which is selected because of its affinity for a particular specie and a multiplicity of valves, pumps, connectors, regulators and other mechanical devices are interconnected to each other and to the bed(s) to permit repeated adsorption/desorption in a cycle to achieve an operating result consistent with the intended application.

In medical applications, pressure swing adsorption cycles have been found to be useful in oxygen concentration systems which provide a source of purified oxygen from an ambient air supply to a single, individual patient. Such oxygen concentration systems are used in the treatment of chronic obstructive pulmonary diseases (COPD) as a result of advances in the medical field which suggest that 24-hour continuous oxygen therapy is a perferred treatment of diseases which include chronic bronchitis, emphysema and asthma.

In contrast with therapeutic supplies of liquid or bottled oxygen, an oxygen concentration unit using an adsorption cycle provides advantages in portability and continuous operation. Several oxygen concentration units are now commercially available and generally provide flow rates of oxygen of from about 2 to 5 liters per minute at purity levels, depending on the rate of demand of from 95% at low demand to 80% at high demand. Disadvantages in such units are that in general a high, consistent purity of oxygen cannot be delivered at a high output rate, even despite the generally "low" volume oxygen production requirements imposed on the system. Here, the currently available oxygen concentration units are generally unable to meet the reasonably anticipated 5 liter per minute flow rate of delivery of a pure oxygen (95%) which may constitute the therapeutic demand required by an individual patient. In addition, even though such units are advantageous over supplies of liquid or bottled oxygen, the bulk and weight of the adsorption unit is considerable. Thus there exists a need for an improved oxygen concentration system, adaptable for medical treatment applications and which meets the stringent demands of reliability, compactness and consistent supply of high purity oxygen in a level which is consistent with the anticipated physiological need of an individual patient.

OBJECTS OF THE INVENTION

It is an object of this invention to provide an improved oxygen concentration cycle, preferably for use in medical applications by which a relatively low volume of high purity oxygen is continuously provided in a cycle which requires an apparatus of lower volume and weight than that conventionally in use.

It is a further object to provide a pressure swing adsorption cycle which provides an efficient use of the pressure source and the adsorption bed and thereby reduces the number of separate elements required in such an apparatus.

In particular, it is an object to provide a pressure swing adsorption cycle suitable for continuous use in a thereapeutic oxygen concentration unit which, in a compact volume of less than three cubic feet and a weight of less than 50 pounds, can reliably deliver oxygen of a purity of 95% at a flow rate of 5 liters per minute.

And in addition, it is a further object to provide such a system which by the inherent design of the cycle employed is capable of achieving such foregoing objects in an apparatus which requires fewer separate unit components than are conventionally used and to provide such a system for the therapeutic delivery of oxygen in the treatment of chronic obstruction pulmonary disease.

These and other objects of the invention will be apparent from the following description of the preferred embodiment, taken in conjunction with the drawings in which:

BRIEF DESCRIPTION OF THE DRAWINGS

FIGS. 2A and 2B show a cycle of the invention with respect to fluid flow in the apparatus of FIG. 1.

DESCRIPTION OF THE PREFERRED EMBODIMENT

A pressure-swing adsorption device in accord with the invention may be constructed using only one adsorption vessel to purify a gaseous feed stream. An efficient implementation of this single bed system is illustrated in FIG. 1, and although this description represents the preferred embodiment, additional variations and improvements are possible with respect to apparatus and configurations using this system.

Figure 1:
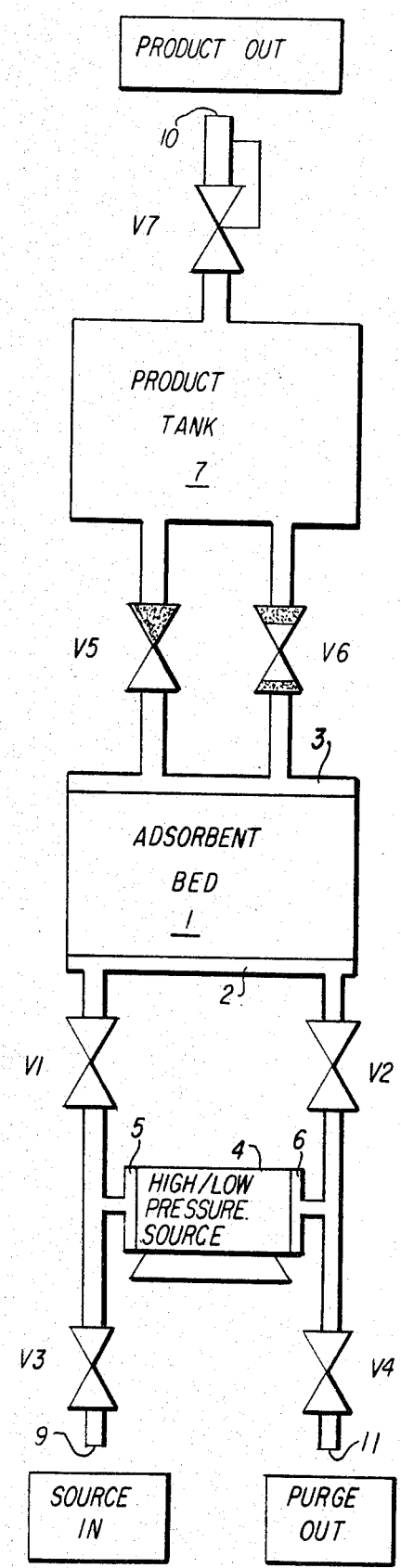
FIG. 1 is a schematic diagram of an apparatus which is capable of using the cycle.

In FIG. 1, an adsorbent bed, 1 consisting of a volume of adsorbent medium such as a molecular sieve adsorbent is connected at the opposite ends thereof 2 and 3 by a valve system including valves V1, V2, V3, and V4 which operationally connect, according to a predetermined cycle, bed end 2 to source 4 which is capable of providing a higher pressure 6 and a lower pressure 5 with respect to a given "ambient" pressure level. The opposite end of bed 3 is connected by a check valve V5 and restriction valve V6 to a product tank/surge vessel 7 which provides the supply of product gas at a pressure regulated by valve V7. The source of the gas or fluid to be purified is introduced to the system at inlet 9. A product gas outlet is provided at 10 and a purge gas outlet is shown at 11.

In prior art single bed cycles, the compressor is not used effectively while the adsorption vessel is undergoing the regeneration step. However, in the use of an apparatus in accord with the cycle of the invention, the compressor is used to lower the vessel pressure during regeneration, thereby improving regeneration efficiency.

In the preferred embodiment, purification of air to produce oxygen or oxygen-enriched air is one useful example of the cycle. During the adsorption phase of a cycle shown in FIG. 2A, a compressor pumps air from the atmosphere to an adsorption vessel, through valves V3 and V2, while Valves V1 and V4 are closed. The adsorption vessel is filled with a suitable adsorbent such as molecular sieve. In an oxygen concentration system the adsorbent will have a preferential affinity for nitrogen, and so removes it from the passing stream. The nitrogen depleted gas passes through a check valve, and also a parallel, partially restricted line, and enters the product tank. A flow of gas is drawn from this tank as the product supply of "purified" oxygen.

Figure 2A:
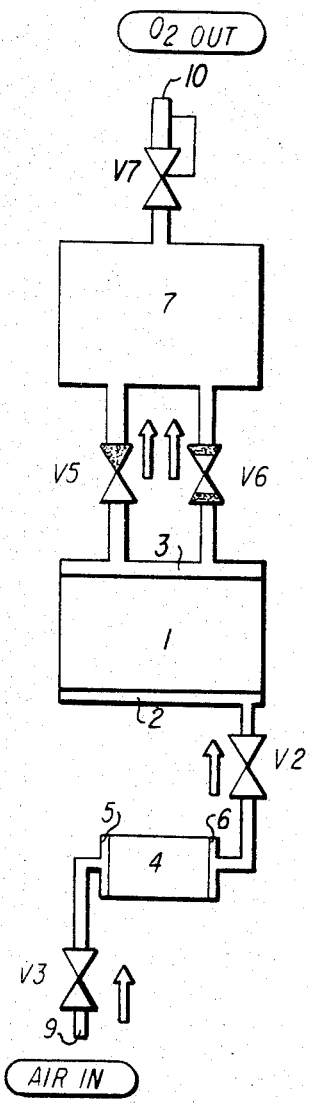

When the adsorbent's capacity for nitrogen is sufficiently exhausted, the position of all four valves is reversed and the system will be purged as the cycle is shown in FIG. 2B. Nitrogen-enriched gas is drawn from the adsorption vessel through valves V1 and V4 while Valves V3 and V2 are closed. Since the compressor discharge is at atmospheric pressure, this creates a vacuum in the adsorption vessel. Product enhanced purity fluid from the product tank is drawn through the restricted line, to purge the adsorbent. As the adsorption vessel pressure drops, the effect of this purge becomes more efficient. In this regard, proper design with respect to overall system pressure insures that the pressure in the product tank is sufficient to supply both product and purge flows. After sufficient purge has been provided to exhaust all nitrogen retained by the bed during the previous adsorption step, the sequence is repeated. Flow patterns of the repetitive operating cycle of the invention is shown in FIGS. 2A and 2B which respectively depict the process and purge states of the system.

EXAMPLE

In a demonstration of the cycle of the apparatus, a compressor adsorbing system configured in accordance with FIG. 1 was interconnected with a 10 pound enclosed bed of a densely packed molecular sieve adsorbent (Grade 13X). At a pressure level of 2.8 p.s.i.g. provided by the compressor and a suction of −2.4 p.s.i.g. during the purge stage, and using a product vessel enclosing a volume of approximately 6 liters, with ambient temperature air (25° C.) as the fluid source, the enhanced efficiency of the cycle of the invention was able to produce a consistently high purity (90%) supply of oxygen at a rate in the range of approximately four to five liters per minute (or, alternatively stated 95% oxygen at the rate of 4.5 liters per minute).

The utilization of such an enhanced cycle in treatment apparatus for chronic obstructive pulmonary disease or for other therapeutic purposes to an individual patient provides the therapeutic benefit of the essentially continuous delivery of a high purity oxygen in a level consistent with anticipated physiological demands of an individual patient in an apparatus having a simplified mechanical configuration.

What is claimed is:

1. An oxygen concentration apparatus which delivers a continuous thereapeutic quantity of purified oxygen from an ambient air source consisting of:
    (A) a serially interconnected
        (1) a source inlet communicating with ambient air;
        (2) a purge outlet communicating with ambient air;
        (3) a compressor having an inlet and an outlet for providing a pressure difference with respect to an ambient pressure level;
        (4) a two ended bed containing a purgeable adsorbent having a selective affinity for gas other than oxygen; and
        (5) a product vessel having an outlet and pressure regulating means in said outlet for the delivery of purified oxygen; the serial interconnection between said source inlet, purge outlet, compressor, bed and vessel comprising gas flow path means connected between: (a) the vessel and one bed end, (b) the other bed end and the compressor inlet and outlet (c) the compressor inlet and the source inlet and (d) the compressor outlet and the purge outlet;
    (B) valve means in said gas flow path means comprising separately operable interconnecting valves being operated in a repeating cycle in which:
        (1) in a first cycle stage, the valves are operated to provide ambient air from the source inlet through the inlet of the compressor to introduce said air to one end of the bed at an elevated pressure, whereby gas other than oxygen is absorbed by the absorbent, and to deliver an oxygen enriched gas from the other end of the bed to the vessel; and
        (2) in the second cycle stage the valves are operated to flow oxygen enriched gas from the vessel to the other end of the bed whereby the absorbent in the bed is purged of absorbed gas by a suction gas flow from the vessel in a reverse direction through the bed and from the one end of the bed to the inlet of the compressor and through the outlet of the compressor to said purge outlet.

2. The apparatus of claim 1 for delivering a supply of thereapeutic oxygen to an individual patient at a purity of approximately 90% at the approximate rate of four to five liters per minute.

3. The apparatus of claim 1 in which the ambient air source is at atmospheric pressure; the bed is an enclosed volume of a molecular sieve adsorbent having an affinity for nitrogen; and the second cycle stage purge of the bed occurs at a pressure which is less than atmospheric pressure.

4. A method for the essentially continuous therapeutic delivery of a source of purified oxygen to a patient consistent with an anticipated physiological need of an individual patient consisting of:
    (A) derriving an enriched supply of oxygen from a serially interconnected
        (1) a source inlet communicating with ambient air;
        (2) a purge outlet communicating with ambient air;
        (3) a compressor having an inlet and an outlet for providing a pressure difference with respect to an ambient pressure level;

(4) a two ended bed containing a purgeable adsorbent having a selective affinity for gas other than oxygen; and
(5) a product vessel having an outlet and pressure regulating means in said outlet for the delivery of purified oxygen; the serial interconnection between said source inlet, purge outlet compressor, bed and vessel comprisng gas flow path means connected between: (a) the vessel and one bed end, (b) the other bed end and the compressor inlet and outlet (c) the compressor inlet and the source inlet and (d) the compressor outlet and the purge outlet;

(B) valve means in said gas flow path means comprising separately operable interconnecting valves being operated in a repeating cycle in which:
(1) in a first cycle stage the valves are operated to provide ambient air from the source inlet through the inlet of the compressor to introduce said air to one end of the bed at an elevated pressure, whereby gas other than oxygen is absorbed by the absorbent, and to deliver an oxygen enriched gas from the other end of the bed to the vessel; and
(2) in the second cycle stage the valves are operated to flow oxygen enriched gas from the vessel to the other end of the bed whereby the absorbent in the bed is purged of absorbed gas by a suction gas flow from the vessel in a reverse direction through the bed and from the one end of the bed to the inlet of the compressor and through the outlet of the compressor to said purge outlet;

(C) continuously administering said enriched supply of oxygen to the patient.

5. A method in accord with claim 2 for the treatment of a patient having a chronic obstructive pulmonary disease.

* * * * *